United States Patent
Papakipos et al.

(10) Patent No.: US 9,246,862 B2
(45) Date of Patent: Jan. 26, 2016

(54) DYNAMIC DUTY-CYCLING OF PROCESSOR OF MOBILE DEVICE BASED ON OPERATING CONDITION OF MOBILE DEVICE

(75) Inventors: Matthew Nicholas Papakipos, Palo Alto, CA (US); Lev Popov, San Francisco, CA (US); Iain Andrew Russell Proctor, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/416,975

(22) Filed: Mar. 9, 2012
(Under 37 CFR 1.47)

(65) Prior Publication Data

US 2013/0238700 A1    Sep. 12, 2013

(51) Int. Cl.
| | |
|---|---|
| *G06F 15/16* | (2006.01) |
| *H04L 12/58* | (2006.01) |
| *G06F 21/81* | (2013.01) |
| *G06F 21/62* | (2013.01) |
| *G01S 19/34* | (2010.01) |
| *H04W 52/02* | (2009.01) |
| *H04L 29/08* | (2006.01) |
| *H04W 4/02* | (2009.01) |

(52) U.S. Cl.
CPC ............... *H04L 51/20* (2013.01); *G01S 19/34* (2013.01); *G06F 21/629* (2013.01); *G06F 21/81* (2013.01); *H04L 51/32* (2013.01); *H04L 67/18* (2013.01); *H04W 4/021* (2013.01); *H04W 4/027* (2013.01); *H04W 52/0241* (2013.01); *G06F 2221/2111* (2013.01)

(58) Field of Classification Search
CPC ....................................................... H04W 4/02
USPC ................ 709/204, 206, 200; 455/456.1, 899
IPC ........................................................ H04W 4/02
See application file for complete search history.

(56) References Cited

U.S. PATENT DOCUMENTS

| 8,386,514 B2 | 2/2013 | Cheng |
|---|---|---|
| 2004/0204184 A1 | 10/2004 | Lin |

(Continued)

FOREIGN PATENT DOCUMENTS

| EP | 1441235 A2 | 7/2004 |
|---|---|---|
| EP | 1903815 A2 | 3/2008 |

(Continued)

OTHER PUBLICATIONS

U.S. Appl. No. 13/545,229, filed Jul. 10, 2012, Jia.

(Continued)

*Primary Examiner* — El Hadji Sall
(74) *Attorney, Agent, or Firm* — Baker Botts L.L.P.

(57) ABSTRACT

In one embodiment, a method includes recording a first location of a mobile device; determining, by one or more processors of a geographic-positioning component of the mobile device, on a periodic basis, a current location of the mobile device; determining, by the processors of the geographic-positioning component, whether the current location is outside a geographic region defined at least in part by the first location; and if the current location is outside the geographic region, then transmitting, by the processors of the geographic-positioning component, a message to one or more other processors of the mobile device, the message causing one or more of the other processors to transition from a sleep state to an active state.

9 Claims, 9 Drawing Sheets

(56) References Cited

U.S. PATENT DOCUMENTS

| | | | |
|---|---|---|---|
| 2006/0064346 A1 | 3/2006 | Steenstra | |
| 2006/0099940 A1 | 5/2006 | Pfleging | |
| 2008/0070593 A1 | 3/2008 | Altman | |
| 2009/0098880 A1 | 4/2009 | Lindquist | |
| 2009/0163226 A1 | 6/2009 | Karkaria | |
| 2009/0164120 A1 | 6/2009 | Boore | |
| 2009/0312032 A1 | 12/2009 | Bornstein | |
| 2010/0081436 A1 | 4/2010 | Kubo | |
| 2010/0232329 A1 | 9/2010 | Park | |
| 2011/0142016 A1* | 6/2011 | Chatterjee | 370/338 |
| 2011/0238755 A1 | 9/2011 | Khan | |
| 2011/0250871 A1 | 10/2011 | Huang | |
| 2011/0250875 A1 | 10/2011 | Huang | |
| 2012/0287031 A1* | 11/2012 | Valko et al. | 345/156 |
| 2012/0309413 A1* | 12/2012 | Grosman et al. | 455/456.1 |
| 2012/0317615 A1* | 12/2012 | Geva et al. | 726/3 |

FOREIGN PATENT DOCUMENTS

| | | |
|---|---|---|
| JP | 2010-081456 | 4/2010 |
| KR | 10-2006-0065339 | 6/2006 |
| WO | 2010-047849 A1 | 4/2010 |
| WO | WO 2011/156789 | 12/2011 |

OTHER PUBLICATIONS

U.S. Appl. No. 13/417,013, filed Mar. 9, 2012, Papakipos.
U.S. Appl. No. 13/431,842, filed Mar. 27, 2012, Papakipos.
Office Action for U.S. Appl. No. 13/417,013, filed Feb. 20, 2013.
Response to Office Action for U.S. Appl. No. 13/417,013 to Papakipos, et al., 8 pages, Jul. 22, 2013.
USPTO Final Office Action for U.S. Appl. No. 13/417,013 to Papakipos, et al., 18 pages, Jul. 31, 2013.
Response to Office Action for U.S. Appl. No. 13/417,013 to Papakipos et al., 8 pages, Sep. 30, 2013.
Notice of Appeal and Pre-Appeal Brief Request for Review, U.S. Appl. No. 13/417,013, ( 6 pgs), Oct. 31, 2013.
Appeal Brief, U.S. Appl. No. 13/417,013, (13 pgs), Dec. 30, 2013.
USPTO Non-Final Office Action for U.S. Appl. No. 13/431,842 to Papakipos, et al., 10 pages, Sep. 17, 2013.
Response Pursuant to C.F.R. § 1.111 for U.S. Appl. No. 13/431,842 to Papakipos, et al., ( 8 pgs), Dec. 17, 2013.
CA Office Action from Canadian Patent Application No. 2,866,158.
CA Communication and Examination Search Report from the Canadian Intellectual Property Office for CA Patent Application No. 2,866,158 May 8, 2015.
European Search Report for EP Patent Application No. 13757856.3 from European Patent Office Jul. 10, 2015.
KR Office Action "Notice of Preliminary Rejection" of the Korean Intellectual Property Office for Application No. 10-2014-7028226 (with English translation) Mar. 4, 2015.
Japanese Office Action "Notification of Reasons for Rejection" for JP Application No. JP 2014-561007 (with English translation) Feb. 3, 2015.
Australian Government Search Information Statement and Patent Examination Report No. 1 for Patent Application 2013230230.
IL Office Action from Patent Authority of the State of Israel Ministry of Justice for Israeli Patent Application No. 234414 (with English translation) May 11, 2015.

* cited by examiner

DYNAMIC DUTY-CYCLING OF PROCESSOR OF MOBILE DEVICE BASED ON OPERATING CONDITION OF MOBILE DEVICE

TECHNICAL FIELD

This disclosure relates generally to geographic positioning capable devices, and, more particularly, to methods of dynamically determining processor duty cycle of a geographic positioning capable device based on geographic position.

BACKGROUND

A social networking system, such as a social networking website, enables its users to interact with it and with each other through the system. The social networking system may create and store a record, often referred to as a user profile, in connection with the user. The user profile may include a user's demographic information, communication channel information, and personal interest. The social networking system may also create and store a record of a user's relationship with other users in the social networking system (e.g., social graph), as well as provide services (e.g., wall-posts, photo-sharing, or instant messaging) to facilitate social interaction between users in the social networking system. A geo-social networking system is a social networking system in which geographic services and capabilities are used to enable additional social interactions. User-submitted location data or geo-location techniques (e.g., mobile phone position tracking) can allow a geo-social network system to connect and coordinate users with local people or events that match their interests. For example, users can check-in to a place using a mobile client application by providing a name of a place (or selecting a place from a pre-established list of places). The geo-social networking system, among other things, can record information about the user's presence at the place and possibly provide this information to other users of the geo-social networking system.

A geographic location of a mobile device (e.g., a cell phone, a tablet computer) equipped with cellular, Wi-Fi and/or GPS (Global Positioning System) capabilities can be identified with geographic positioning signals obtained by cell tower triangulation, Wi-Fi positioning, and/or GPS positioning. Such mobile devices may have additional functionalities incorporating geographic location data of the devices, for example, providing driving directions, displaying a map of a current location, or providing information of nearby points of interest such as restaurants, gas stations, etc.

DESCRIPTION OF EXAMPLE EMBODIMENTS

Figure 1:
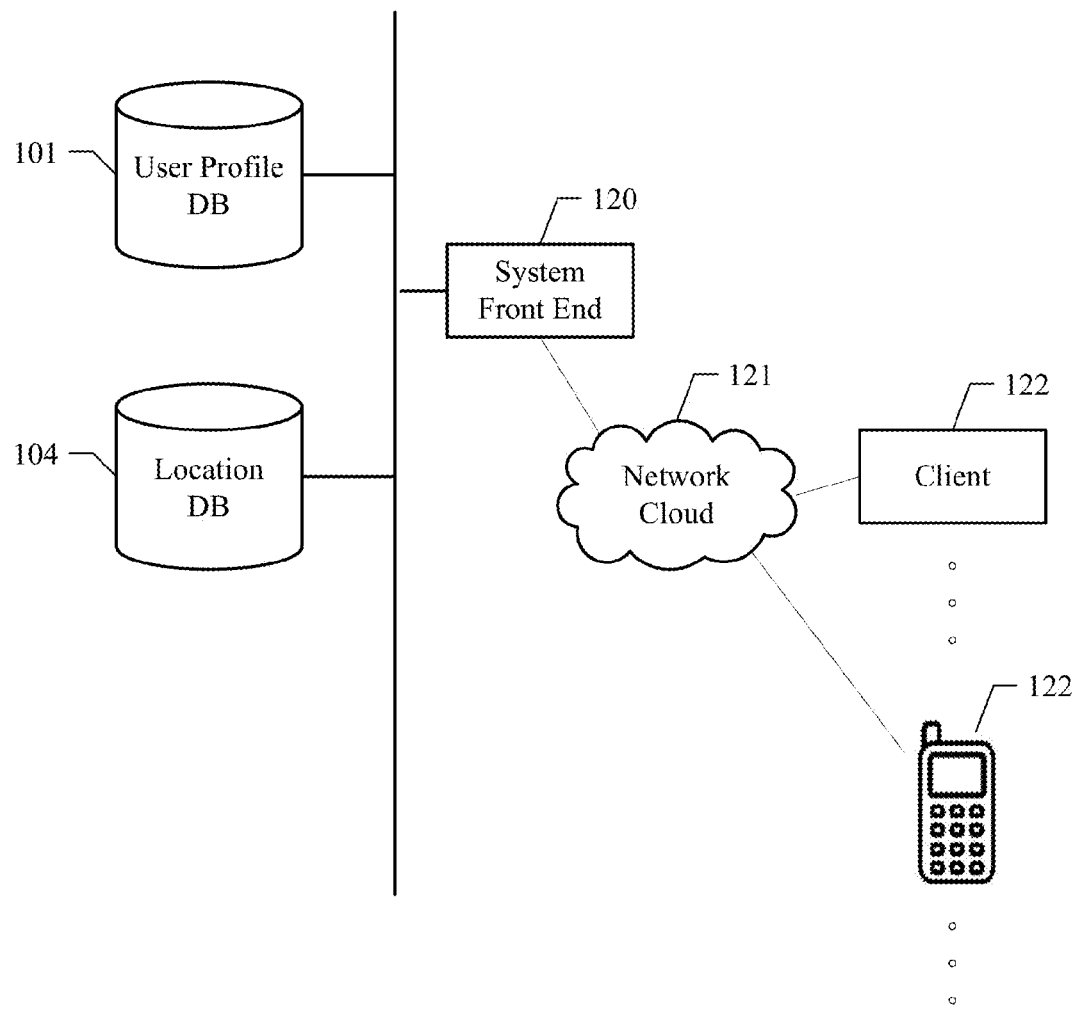
FIG. 1 illustrates an example social networking system.

A social networking system, such as a social networking website, enables its users to interact with it, and with each other through, the system. Typically, to become a registered user of a social networking system, an entity, either human or non-human, registers for an account with the social networking system. Thereafter, the registered user may log into the social networking system via an account by providing, for example, a login ID or username and password. As used herein, a "user" may be an individual (human user), an entity (e.g., an enterprise, business, or third party application), or a group (e.g., of individuals or entities) that interacts or communicates with or over such a social network environment.

When a user registers for an account with a social networking system, the social networking system may create and store a record, often referred to as a "user profile", in connection with the user. The user profile may include information provided by the user and information gathered by various systems, including the social networking system, relating to activities or actions of the user. For example, the user may provide his name, profile picture, contact information, birth date, gender, marital status, family status, employment, education background, preferences, interests, and other demographical information to be included in his user profile. The user may identify other users of the social networking system that the user considers to be his friends. A list of the user's friends or first degree contacts may be included in the user's profile. Connections in social networking systems may be in both directions or may be in just one direction. For example, if Bob and Joe are both users and connect with each another, Bob and Joe are each connections of the other. If, on the other hand, Bob wishes to connect to Sam to view Sam's posted content items, but Sam does not choose to connect to Bob, a one-way connection may be formed where Sam is Bob's connection, but Bob is not Sam's connection. Some embodiments of a social networking system allow the connection to be indirect via one or more levels of connections (e.g., friends of friends). Connections may be added explicitly by a user, for example, the user selecting a particular other user to be a friend, or automatically created by the social networking system based on common characteristics of the users (e.g., users who are alumni of the same educational institution). The user may identify or bookmark websites or web pages he visits frequently and these websites or web pages may be included in the user's profile.

The user may provide information relating to various aspects of the user (such as contact information and interests) at the time the user registers for an account or at a later time. The user may also update his or her profile information at any time. For example, when the user moves, or changes a phone number, he may update his contact information. Additionally, the user's interests may change as time passes, and the user may update his interests in his profile from time to time. A user's activities on the social networking system, such as frequency of accessing particular information on the system, may also provide information that may be included in the user's profile. Again, such information may be updated from time to time to reflect the user's most-recent activities. Still further, other users or so-called friends or contacts of the user may also perform activities that affect or cause updates to a user's profile. For example, a contact may add the user as a friend (or remove the user as a friend). A contact may also write messages to the user's profile pages—typically known as wall-posts. A user may also input status messages that get posted to the user's profile page.

A social network system may maintain social graph information, which can generally model the relationships among groups of individuals, and may include relationships ranging from casual acquaintances to close familial bonds. A social network may be represented using a graph structure. Each node of the graph corresponds to a member of the social network. Edges connecting two nodes represent a relationship between two users. In addition, the degree of separation between any two nodes is defined as the minimum number of hops required to traverse the graph from one node to the other. A degree of separation between two users can be considered a measure of relatedness between the two users represented by the nodes in the graph.

Social networking system may maintain a database of information relating to geographic locations or places. Places may correspond to various physical locations, such as restaurants, bars, train stations, airports and the like. In one implementation, each place can be maintained as a hub node in a social graph or other data structure maintained by the social networking system, as described in U.S. patent application Ser. No. 12/763,171, which is incorporated by reference herein for all purposes. Social networking system may allow users to access information regarding each place using a client application (e.g., a browser) hosted by a wired or wireless station, such as a laptop, desktop or mobile device. For example, social networking system may serve web pages (or other structured documents) to users that request information about a place. In addition to user profile and place information, the social networking system may track or maintain other information about the user. For example, the social networking system may support geo-social networking system functionality including one or more location-based services that record the user's location. For example, users may access the geo-social networking system using a special-purpose client application hosted by a mobile device of the user (or a web- or network-based application using a browser client). The client application may automatically access Global Positioning System (GPS) or other geo-location functions supported by the mobile device and report the user's current location to the geo-social networking system. In addition, the client application may support geo-social networking functionality that allows users to check-in at various locations and communicate this location to other users. A check-in to a given place may occur when a user is physically located at a place and, using a mobile device, access the geo-social networking system to register the user's presence at the place. A user may select a place from a list of existing places near to the user's current location or create a new place. The social networking system may automatically checks in a user to a place based on the user's current location and past location data, as described in U.S. patent application Ser. No. 13/042,357 filed on Mar. 7, 2011, which is incorporated by reference herein for all purposes. An entry including a comment and a time stamp corresponding to the time the user checked in may be displayed to other users. For example, a record of the user's check-in activity may be stored in a database. Social networking system may select one or more records associated with check-in activities of users at a given place and include such check-in activity in web pages (or other structured documents) that correspond to a given place. The check-in activity may also be displayed on a user profile page and in news feeds provided to users of the social networking system.

Still further, a special purpose client application hosted on a mobile device of a user may be configured to continuously capture location data of the mobile device and send the location data to social networking system. In this manner, the social networking system may track the user's location and provide various recommendations to the user related to places that are proximal to the user's current trajectory or path or that are frequented by the user. In one implementation, a user may opt in to this recommendation service, which causes the client application to periodically post location data of the user to the social networking system.

FIG. 1 illustrates an example social networking system. In particular embodiments, the social networking system may store user profile data and social graph information in user profile database 101. In particular embodiments, the social networking system may store geographic and location data in location database 104. In particular embodiments, databases 101 and 104 may be operably connected to the social networking system's front end. In particular embodiments, the front end 120 may interact with client device 122 through network cloud 121. Client device 122 is generally a computer or computing device including functionality for communicating (e.g., remotely) over a computer network. Client device 122 may be a desktop computer, laptop computer, personal digital assistant (PDA), in- or out-of-car navigation system, smart phone or other cellular or mobile phone, or mobile gaming device, among other suitable computing devices. Client device 122 may execute one or more client applications, such as a web browser (e.g., Microsoft Windows Internet Explorer, Mozilla Firefox, Apple Safari, Google Chrome, and Opera, etc.) or special-purpose client application (e.g., Facebook for iPhone, etc.), to access and view content over a computer network. Front end 120 may include web or HTTP server functionality, as well as other functionality, to allow users to access the social networking system. Network cloud 121 generally represents a network or collection of networks (such as the Internet or a corporate intranet, or a combination of both) over which client devices 122 may access the social network system.

In particular embodiments, location database 104 may store an information base of places, where each place includes a name, a geographic location and meta information (such as the user that initially created the place, reviews, comments, check-in activity data, and the like). Places may be created by administrators of the system and/or created by users of the system. For example, a user may register a new place by accessing a client application to define a place name and provide a geographic location and cause the newly created place to be registered in location database 104. As discussed above, a created place may correspond to a hub node, which an administrator can claim for purposes of augmenting the information about the place and for creating ads or other offers to be delivered to users. In particular embodiments, system front end 120 may construct and serve a web page of a place, as requested by a user. In some embodiments, a web page of a place may include selectable components for a user to "like" the place or check in to the place. In particular embodiments, location database 104 may store geo-location data identifying a real-world geographic location of a user associated with a check-in. For example, a geographic location of an Internet connected computer can be identified by the computer's IP address. For example, a geographic location of a cell phone equipped with cellular, Wi-Fi and/or GPS capabilities can be identified by cell tower triangulation, Wi-Fi positioning, and/or GPS positioning. In particular embodiments, location database 104 may store a geographic location and additional information of a plurality of places. For example, a place can be a local business, a point of interest (e.g., Union Square in San Francisco, Calif.), a college, a city, or a national park. For example, a geographic location of a place (e.g., a local coffee shop) can be an address, a set of geographic coordinates (latitude and longitude), or a reference to another place (e.g., "the coffee shop next to the train station"). For example, additional information of a place can be business hours, photos, advertisements, or user reviews of the place. In particular embodiments, location database 104 may store a user's location data. For example, a user can create a place (e.g., a new restaurant or coffee shop) and the social networking system can store the created place in location database 104. For example, location database 104 may store a user's check-in activities. For example, location database 104 may store a user's geographic location provided by the user's GPS-equipped mobile device.

Figure 2:
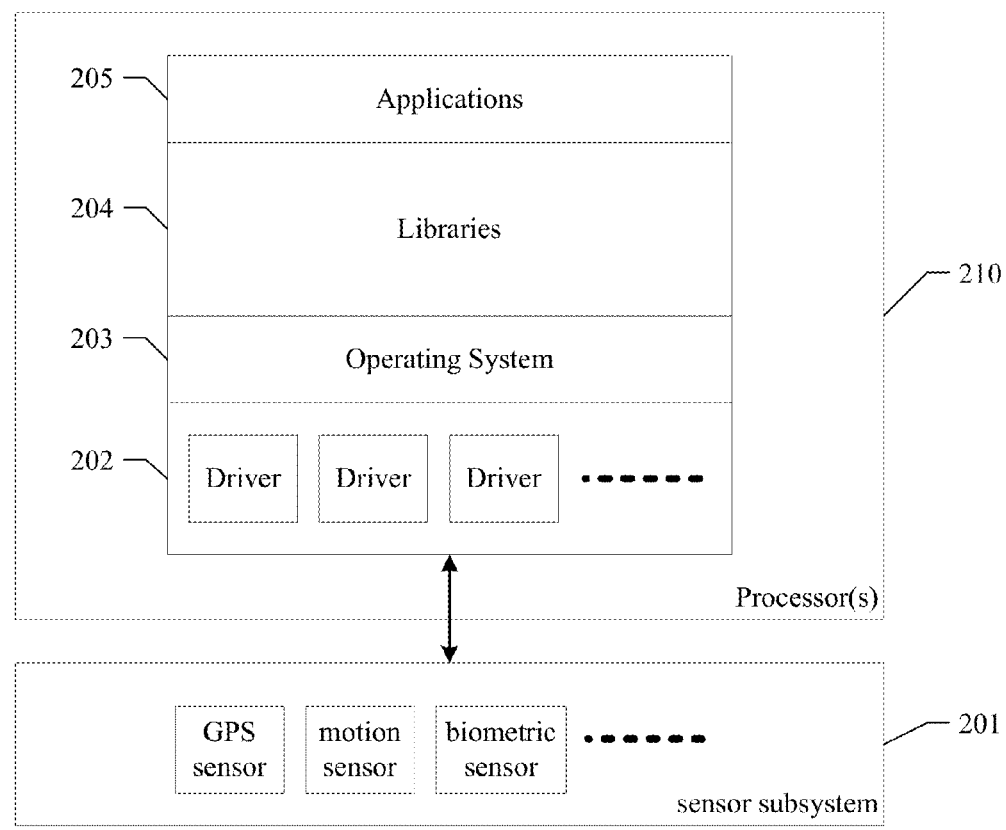
FIG. 2 illustrates an example processing stack of a mobile device with one or more sensor devices.

A mobile device system may comprise one or more sensor devices to provide additional inputs and facilitate multiple functionalities of the system. Processing of sensor inputs by a system with one or more sensor devices (for example, processing a GPS sensor signal and displaying in the device's graphical user interface a map of a location corresponding to the GPS sensor signal) may be implemented by a combination of hardware, software, and/or firmware (or device drivers). FIG. 2 illustrates an example processing stack of a mobile device (e.g., a smart phone) with one or more sensor devices. In the example of FIG. 2, sensor subsystem 201 of the mobile device can include one or more sensor devices, for example, a GPS sensor for location positioning, and a motion sensor for determining orientation of the mobile device, etc. One or more device drivers in driver layer 202 hosted by one or more processors 210 of the mobile device can communicate and control the one or more sensors of sensor subsystem 201. For example, a device driver can receive and process a GPS signal generated by a GPS sensor. For example, a device driver can receive and process sensor signals generated by multiple sensors in sensor subsystem 201. One or more processors 210 can host various software programs, for example, operating system 203 running one or more application programs (e.g., web browser, address book, etc.) in applications 205 and managing sensor subsystem 201 via the one or more device drivers in driver layer 202. Libraries 204 can include one or more libraries used by one or more application programs in applications 205. For example, a web browser application can access a mapping library (e.g., via a function call) that generates a map containing a GPS location obtained by a device driver interpreting a GPS signal from a GPS sensor, and display the map in the web browser application's graphical user interface.

One or more processors of a system, while not being active (i.e., not executing one or more programs), can enter a sleep state to reduce energy consumption by the system. For example, a sleep state can be that all computing states of a processor are saved in a main memory and the processor is powered off. For example, a sleep state can be that a processor is not executing instructions, but all computing states of the processor are still maintained in the processor (e.g., stored in the processor's cache).

Ordinarily, in order for a system comprising one or more sensors to access a sensor (or process a sensor signal) of the system, one or more processors of the system need to be in an active state to access the sensor via a device driver. For example, for a special-purpose client application hosted on a user's mobile device to continuously capture locations of the user as described above, one or more processors of the mobile device need to be in an active state to access a GPS sensor driver as often as the sampling frequency of the continuous location capturing (e.g., every five minutes), even when there is little location change (e.g., the user is attending a meeting for the next two hours), and the one or more processors could be in a sleep state instead of being in the active state. This can cause unnecessary periods of the active state, or duty cycles, of the one or more processors of the mobile device, thus cause higher energy consumption and shorter battery life of the mobile device. Particular embodiments herein describe methods of dynamically determining processor duty cycle of a mobile device while continuously accessing geographic position with the mobile device's geographic positioning device. Although the mobile device's position or location may be determined by accessing and analyzing geographic positioning signals via a sensor, it is contemplated that any suitable method for obtaining a mobile device or device user's geographical location may be used to dynamically determine processor duty cycles for the mobile device. Particular embodiments utilize a geographic positioning device that can be programmed to execute programs for controlling a geographic position sensing circuit, translating geographic positioning signals from the geographic position sensing circuit to geographic locations, performing computations (e.g., calculating a distance between two geographic locations obtained from the geographic position sensing circuit, or determining whether a condition is met), and alerting the one or more processors of the mobile device if a condition is met (e.g., if a distance calculated is greater than a pre-determined threshold). In some embodiments, the geographic positioning device may comprise a geographic position sensing circuit that receives geographic positioning signals (e.g., a GPS sensor), a memory, one or more lower-power processors that can be programmed to execute programs to control the geographic position sensing circuit and perform computations, and an interface circuit (e.g., I2C bus) that communicates with the one or more processors of the mobile device. In one embodiment, the geographic positioning device may be implemented as a single module or a single integrated circuit situated within the mobile device, comprising the geographic position sensing circuit, the memory, and the one or more lower-power processors, operably coupled to the one or more processors of the mobile system via the interface circuit. In other embodiments, the geographic positioning device may comprise a sensor hub (such as the sensor subsystem of the mobile device illustrated in FIG. 2) comprising one or more sensor circuits that receive one or more sensor signals (including, for example, geographic positioning signals such as GPS signals), a memory, one or more lower-power processors that can be programmed to control the sensor circuits and perform computations (such as calculating a distance between two geographic locations described above), and an interface circuit that communicates with the one or more processors of the mobile device. In one embodiment, the sensor hub may be implemented as a single module or a single integrated circuit situated within the mobile device, comprising the one or more sensor circuits, the memory, and the one or more lower-power processors, operably coupled to the one or more processors of the mobile device via the interface circuit.

Figure 3:
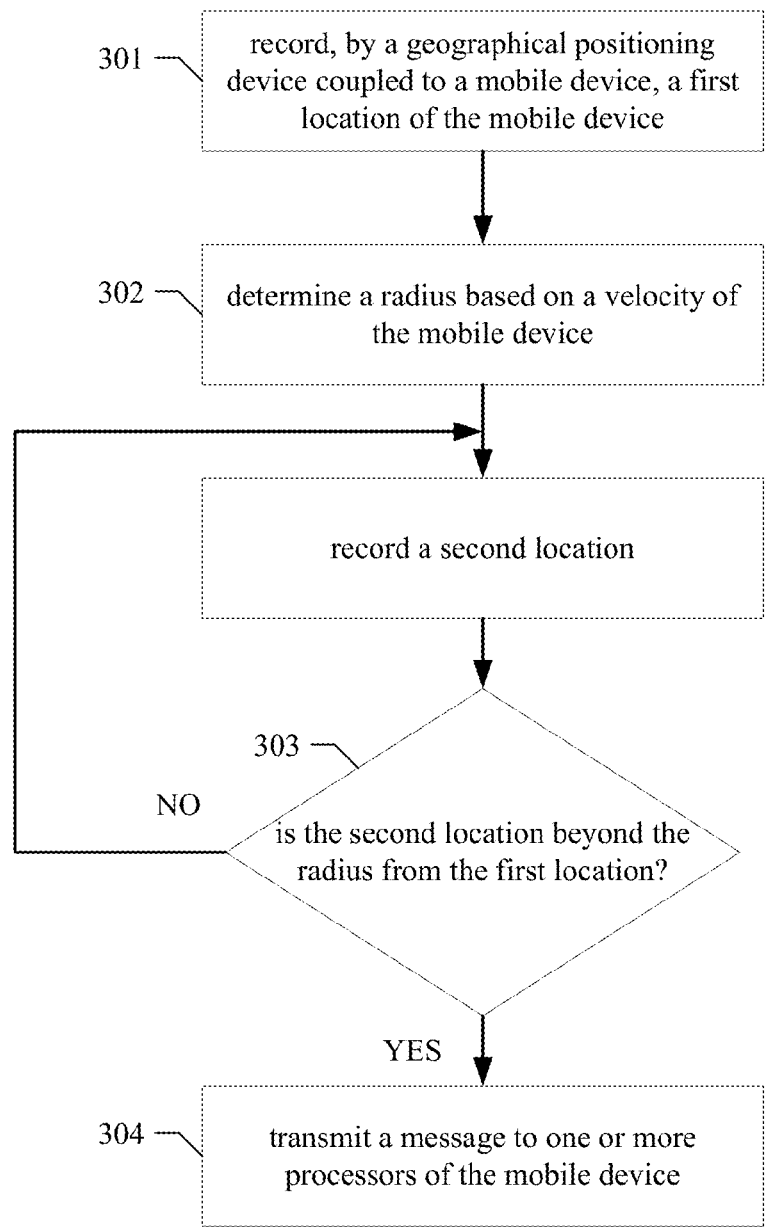
FIG. 3 illustrates an example method of dynamically determining processor duty cycle based on geographic position.
Figure 4:
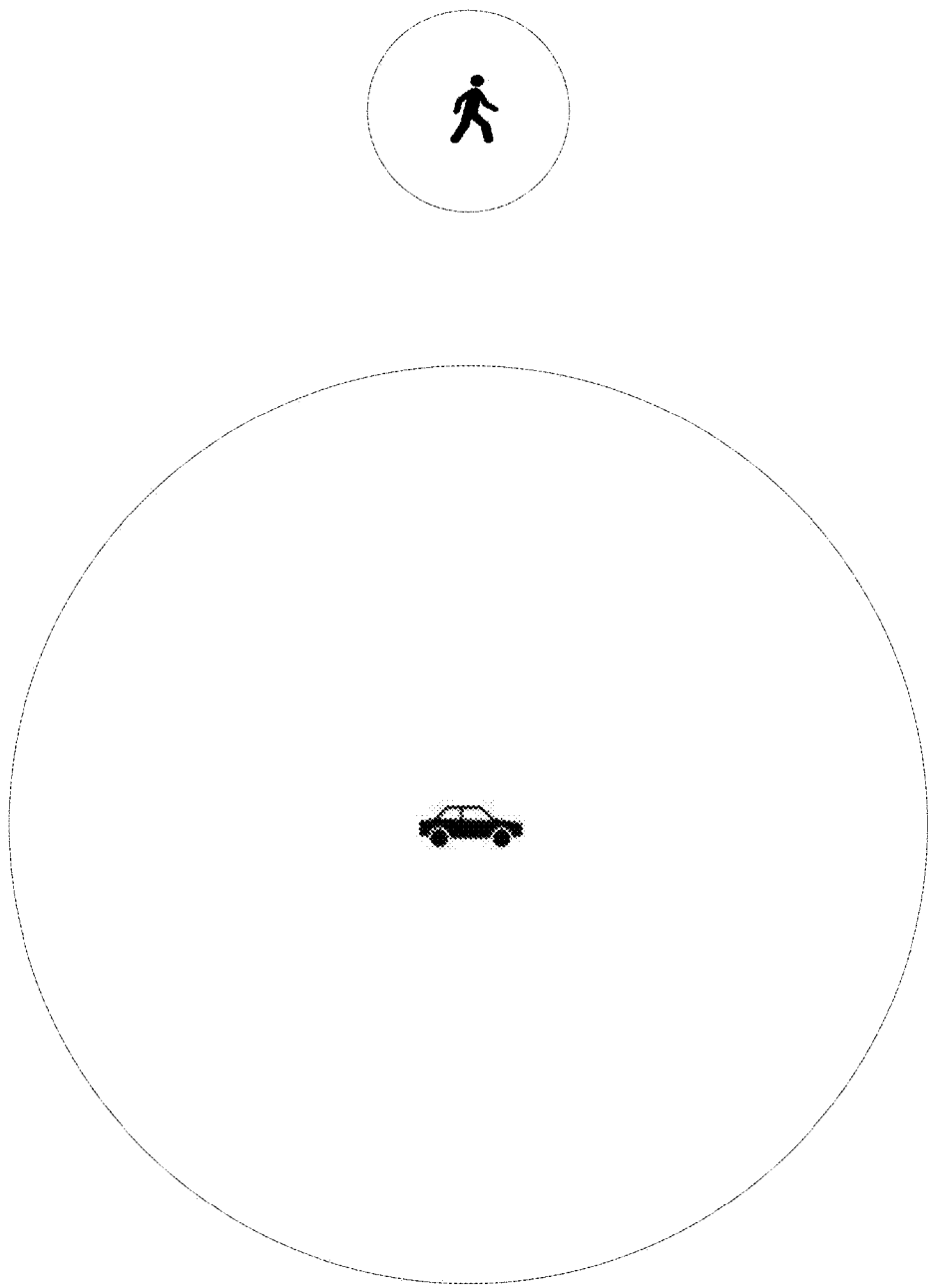
FIG. 4 illustrates example radii for the example method of FIG. 3.

FIG. 3 illustrates an example method of dynamically determining processor duty cycle based on geographic position. The example method of FIG. 3 utilizes a radius to determine whether there is a substantial change of a user's location (e.g., if a user goes beyond the radius) based on geographic position obtained by the user's mobile device, and alert or wake up one or more processors of the mobile device to process the location change. In particular embodiments, a mobile device (e.g., a mobile phone, netbook, smartphone, tablet, or other portable device) may comprise one or more processors and a geographic positioning device (or a sensor hub as described above). In particular embodiments, the geographic positioning device may record a first position (301). In particular embodiments, the geographic positioning device may determine a radius based on a velocity of the mobile device (302). FIG. 4 illustrates example radii for the example method of FIG. 3. For example, if a user is walking with a velocity of 3 miles per hour, the geographic positioning device may determine a radius of a quarter mile. For example, if a user has a higher velocity (e.g., the user is driving at 65 miles per hour), the geographic positioning device may determine a larger radius (e.g., 5 miles) so that there is not too frequent detection of location changes. In particular embodiments, if a user is stationary (e.g., the user is watching a movie at home), the geographic positioning device may assign a pre-determined value to the radius (e.g., 500 feet).

In particular embodiments, the geographic positioning device may determine a velocity of the mobile device based on recent location data stored locally at the mobile device. In some embodiments, the geographic positioning device may determine a default velocity (e.g., 3 miles per hour) if no recent location data is available.

In some embodiments, the geographic positioning device may determine a radius based on time of day. For example, the geographic positioning device can access time of day information via a system call. For example, the geographic positioning device can determine a smaller radius (e.g., a quarter mile) if the time of day information corresponds to an evening hour (e.g., between 10 PM to 6 AM) since the mobile device's user is likely to have less movement. In other embodiments, the geographic positioning device may determine a radius based on a power budget available for the mobile device. For example, an operating system or an application program hosted by the mobile device can access battery level information (e.g., via a function call) and transmit the battery level information to the geographic positioning device. For example, if the mobile device's battery level is less then a pre-determined threshold (e.g., 20% of full capacity), the geographic positioning device may determine a larger radius so that there is less frequent detection of location changes, thus reducing power consumption and preserving remaining battery power. In yet another embodiment, the geographic positioning device may determine a radius based on an error associated with recording one or more locations. An error associated with one or more recorded locations may depend on one or more sources of the recording (e.g., GPS, cell-tower triangulation, etc.), movement of the mobile device, time of the recording, etc. For example, to avoid erroneous detection of location changes, the geographic positioning device can obtain an accuracy distance, e.g., a horizontal distance greater than the error associated with the one or more recorded locations, and determine a radius at least two times of the accuracy distance. In particular embodiments, the geographic positioning device may determine a radius based on multiple factors, such as time of day, power budget, and/or errors associated with recorded locations described above. For example, the geographic positioning device can determine a radius based on a weighted average of radii determined by each individual factor. For example, the geographic positioning device can determine a radius based on power budget only if the mobile device's battery level is very low (e.g., 10% of full capacity). In some embodiments, one or more client applications hosted by the one or more processors of the mobile system may determine a radius based on velocity, time of day, power budget, or errors associated with recorded locations. For example, a special-purpose client application for continuously capturing and storing a user's location data in a remote data store can determine a radius based on a velocity calculated by most recent location data of the user, and provide the radius to the geographic positioning device. In some embodiments, the one or more client applications may determine a radius based on multiple factors, such as velocity, time of day, power budget, and/or errors associated with recorded locations.

In particular embodiments, the geographic positioning device may record one or more additional locations at a pre-determined frequency (e.g., every ten minutes), and determine if a second location of the one or more additional locations is beyond the radius from the first location (303). In yet other embodiments, the geographic positioning device may record one or more additional locations at a frequency that is dynamically determined based on factors related to the mobile device, including, for example, the user's location. If there are no additional locations beyond the radius from the first location, i.e., there is no substantially change in location, the geographic positioning device may continue to record one or more additional locations at the pre-determined frequency. If a second location of the additional locations is beyond the radius from the first location, the geographic positioning device may transmit a message to the one or more processors of the mobile device (304). In particular embodiments, the message may comprise the second location. In particular embodiments, the message may cause at least one of one or more processors to transition from a sleep state to an active state. Additionally, the geographic positioning device may continue the example method of FIG. 3. For example, the geographic positioning device may record a new first position by using a previous second location that is beyond a previous radius from a previous first location (301), determine a new radius (302), and determine whether there is substantially change in location based on the new first location and the new radius (303).

Figure 4A:
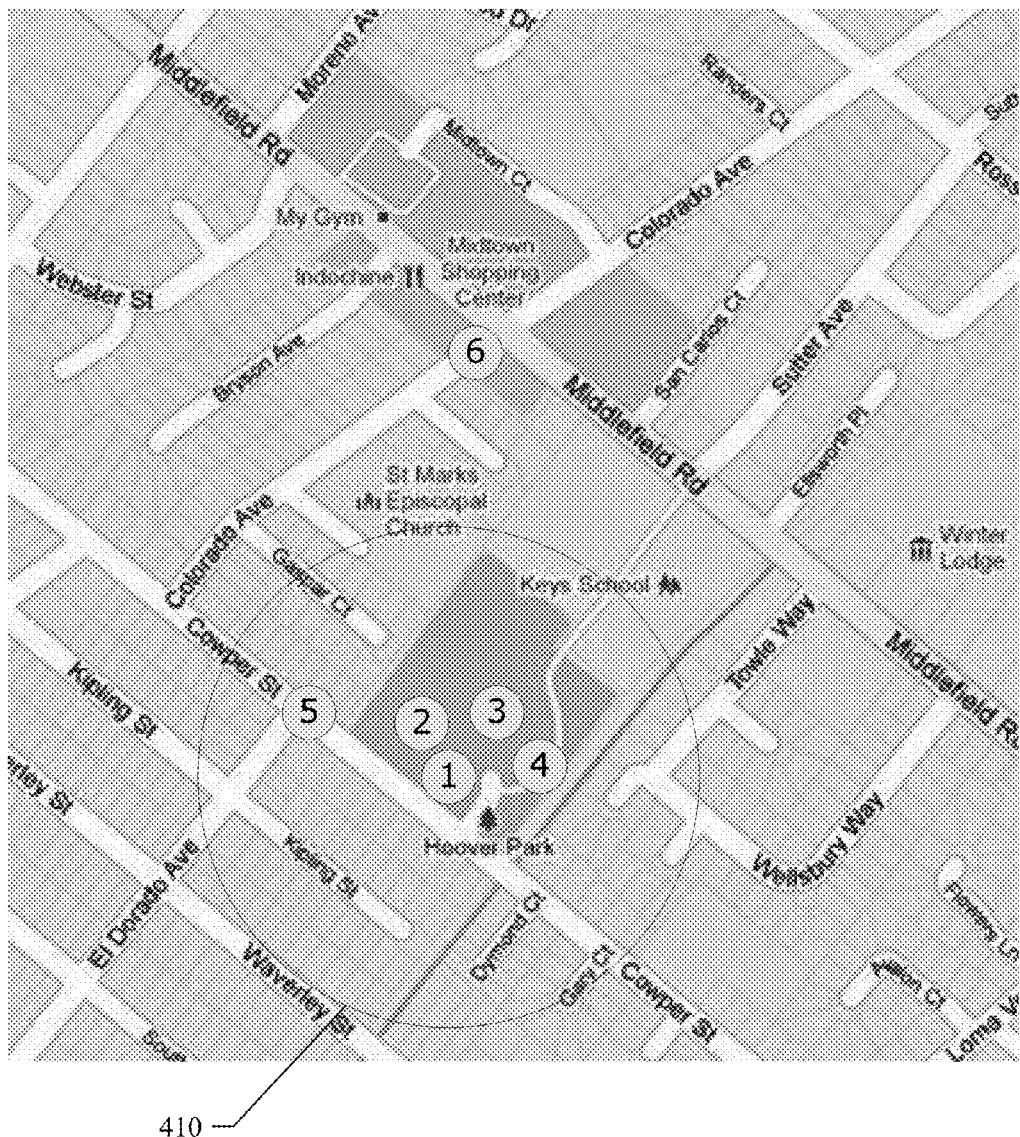
FIGS. 4A and 4B illustrate a user's movement.
Figure 4B:
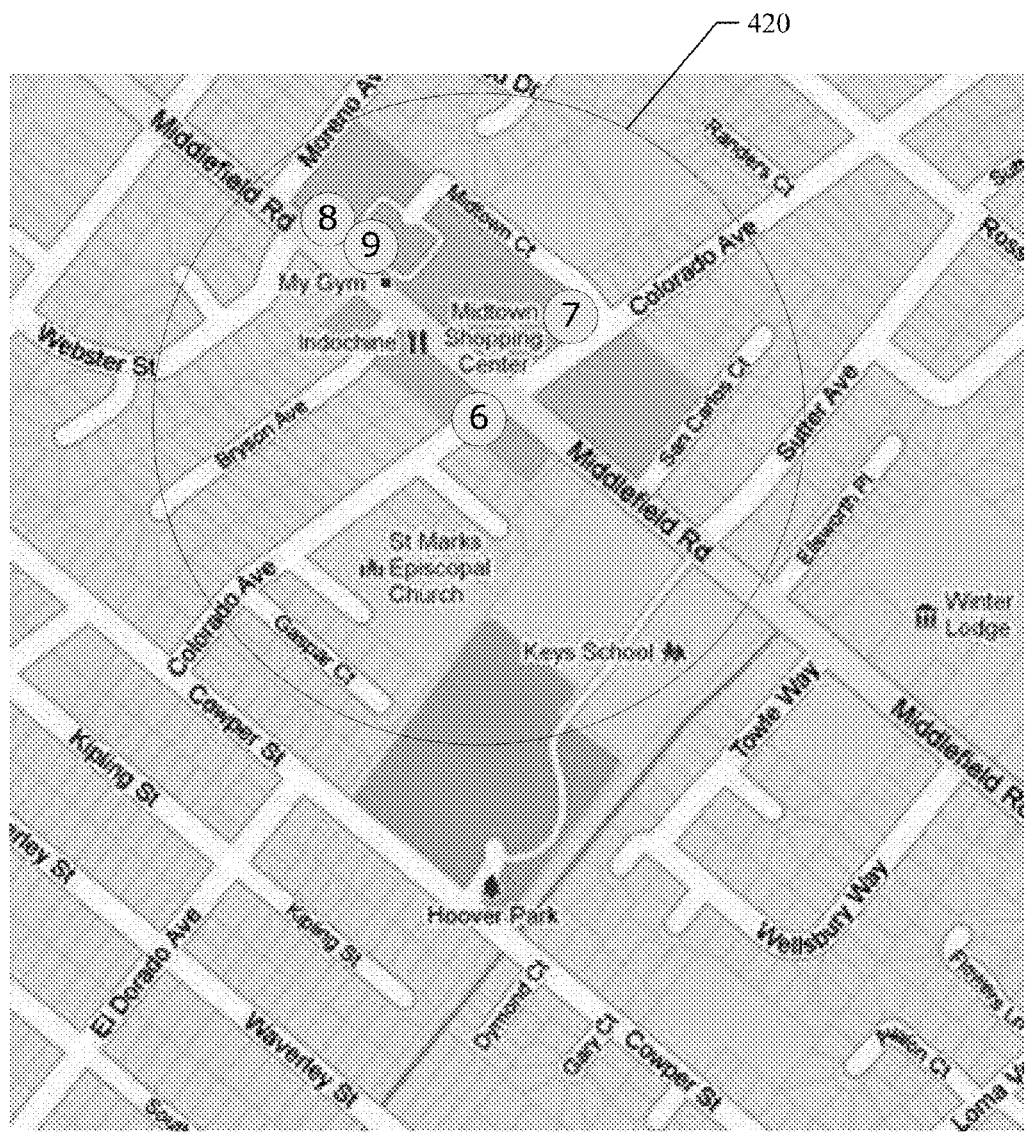

The example method of FIG. 3 can be further illustrated by FIGS. 4A and 4B. FIGS. 4A and 4B illustrates a user's movement. In the example of FIG. 4A, a user carrying a GPS-equipped mobile phone is at a park ("Hoover Park"). A special-purpose client application hosted by one or more processors of the mobile phone can continuously capture the user's locations (by accessing a GPS sensor of the mobile phone via a device driver) and store the locations at location database 104, at an interval of, for example, every ten minutes. The interval length may, in other embodiments, be varied. Ordinarily, one or more processors of the mobile device is active at least every ten minutes in order to access the GPS sensor and store the locations at location database 104. In contrast, with the example method of FIG. 3, the special-purpose client application can instruct a sensor hub comprising a GPS sensor and other sensors, a memory, one or more lower-power processors and an interface circuit communicating with the one or more processors of the mobile device, to start recording a first location (location "1" in FIG. 4A) and determine a radius 410 based on a velocity of the mobile phone, and if there is no other programs running on the one or more processors at the time, the one or more processors can enter a sleep state. The sensor hub can continue to record new locations every ten minutes, and determine whether the new locations are beyond radius 410 from the first location. For example, the user may be playing with his kids at the park for the next 30 minutes (e.g., as recorded locations "2", "3", and "4"), and just start to leave the park afterwards (e.g., as recorded location "5"). Since there is no substantial change in the user's location (i.e., the user is at or near the park) as determined by radius 410, the sensor hub with the one or more lower-power processors, which may consume substantially lower power than the one or more processors of the mobile device, can continue to record new locations every ten minutes while the one or more processors of the mobile device are at the sleep state. In particular embodiments, the frequency of location capturing may occur at intervals determined dynamically based on various factors including, for example, the location of the mobile device. In the example of FIG. 4A, if the sensor hub determines that the user has moved to a particular location beyond radius 410, as illustrated by location "6" in FIG. 4A, the sensor hub can transmit a message comprising the particular location to the one or more processors, causing at least one of the one or more processors transition from the sleep state to an active state, and execute the special-purpose client application to process the updated location data. For example, the special-purpose client application may transmit the location to a remote host as part of a location-based query in order to receive information relevant to the location (e.g., points of interest near the location such as restaurants, parks, or advertisements relevant to the location such as an a coupon from coffee shop near the location). The special purpose client application may also transmit the updated location data to a remote data store, such as location database 104, for storage in association with a user identifier, and enabling additional functions, for example, automatically checking in a user to a place near the location, or alerting a user's first-degree contacts who are near the location (or vice versa). In the example of FIG. 4B, the sensor hub may determine a radius 420 (centered on location "6") and start recording new locations (locations "7", "8", "9"), and determine whether there is substantially change in location, while the one or more processors of the mobile device may enter the sleep state if there is no other programs running on the one or more processors.

In particular embodiments, the method for dynamically determining processor duty cycle of a mobile device while continuously accessing geographic position with the mobile device's geographic positioning device need not involve the calculation of a location radius. In particular embodiments, whether with or without hardware or software support for radius calculation, one or more processors of the mobile device may be alerted to transition their states (e.g., from a sleep state to an active state) based on certain conditions being met, as described herein. As an example, the one or more processors of the mobile system may be alerted to transition from a sleep state to an active state based on the present location of the mobile device user. This location may be determined, by way of example and without limitation, via GPS, Wi-Fi, or cell tower signals, as well as by previous geographic position signal values and with the aid of any suitable techniques, including, for example, dead reckoning or Kalman filtering. As another example, the one or more processors of the mobile system may be alerted to transition their state based on the velocity of the user. The user's velocity may be determined, for example, by keeping track of both present and past user locations to create an estimate of the user's trajectory and speed. In other embodiments, one or more processors of the mobile device may be alerted to transition their state based on time of day. If, for example, the time is in the middle of the night when the user is likely sleeping (based, in particular embodiments, on prior user activity), the processors of the mobile device may be alerted to transition to a sleep state. In other embodiments, one or more processors of the mobile device may be alerted to transition their state based on user activity. For example, if the mobile device is determined to be in a pocket or desk of the user, then the processors may transition to a sleep state, whereas if the mobile device is determined to be in the user's hand, the processors may transition to an active state. As another example, the processors may transition state based on input from a hand sensor on the mobile device. If such a hand sensor determines that the user's hand is touching, or in proximity to, the mobile device, then the processors of the mobile device may transition to an alert state, for example. In yet other embodiments, if the user is in or near a social entity (on the social network) of interest to the user (e.g., as determined by the user's profile on the social network), the processors of the mobile device may be alerted to transition to an awake state, and similarly, if the user is not near any (or near a threshold number) of social entities of interest to the user, the processors may transition to a sleep state. For example, if the user is near a location that is also a social entity, and the user frequents this location (determined, for example, by the user's social network check-ins to that location), the processors of the mobile system may be alerted to transition to an active state. Similarly, if the user is located near one or more friends or first-degree contacts of the user, the processors may be alerted to transition to an active state. As another example, a history of the user's locations may also be used to create a trajectory, and the trajectory information may similarly be used to alert the processors of the mobile system depending on the locations or contacts of interest near to the user's trajectory. Any combination of the factors described herein may be used to determine whether the processors of the mobile device should be alerted to transition their state. Additionally, the frequency with which any of the processors of the mobile device are alerted to transition to an awake state (e.g., every ten minutes) may be determined dynamically based, for example, on the user's location, as well as by any suitable factor including, for example, those mentioned herein.

Particular embodiments utilize a geographic positioning device that can be programmed to execute programs for controlling a geographic position sensing circuit, translating geographic positioning signals from the geographic position sensing circuit to geographic locations, performing computations (e.g., calculating a distance between two geographic locations obtained from the geographic position sensing circuit, or determining whether a condition is met), and alerting the one or more processors of the mobile device if a condition is met (e.g., if a distance calculated is greater than a predetermined threshold).

Figure 5:
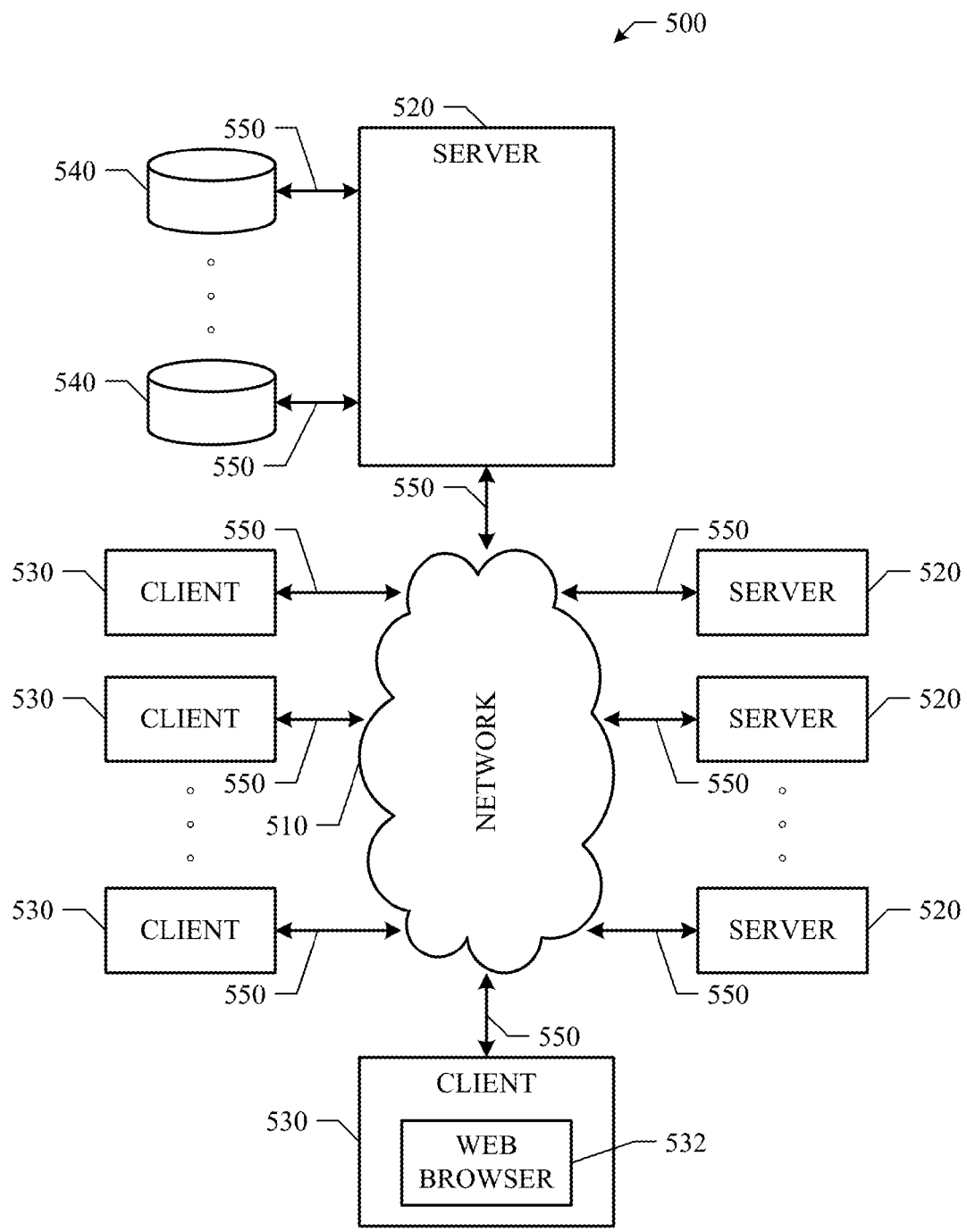
FIG. 5 illustrates an example network environment.

While the foregoing embodiments may be implemented in a variety of network configurations, the following illustrates an example network environment for didactic, and not limiting, purposes. FIG. 5 illustrates an example network environment 500. Network environment 500 includes a network 510 coupling one or more servers 520 and one or more clients 530 to each other. Network environment 500 also includes one or more data storage 540 linked to one or more servers 520. Particular embodiments may be implemented in network environment 500. For example, social networking system frontend 120 may be written in software programs hosted by one or more servers 520. For example, event database 102 may be stored in one or more storage 540. In particular embodiments, network 510 is an intranet, an extranet, a virtual private network (VPN), a local area network (LAN), a wireless LAN (WLAN), a wide area network (WAN), a metropolitan area network (MAN), a portion of the Internet, or another network 510 or a combination of two or more such networks 510. This disclosure contemplates any suitable network 510.

One or more links 550 couple a server 520 or a client 530 to network 510. In particular embodiments, one or more links 550 each includes one or more wired, wireless, or optical links 550. In particular embodiments, one or more links 550 each includes an intranet, an extranet, a VPN, a LAN, a WLAN, a WAN, a MAN, a portion of the Internet, or another link 550 or a combination of two or more such links 550. This disclosure contemplates any suitable links 550 coupling servers 520 and clients 530 to network 510.

In particular embodiments, each server 520 may be a unitary server or may be a distributed server spanning multiple computers or multiple datacenters. Servers 520 may be of various types, such as, for example and without limitation, web server, news server, mail server, message server, advertising server, file server, application server, exchange server, database server, or proxy server. In particular embodiments, each server 520 may include hardware, software, or embedded logic components or a combination of two or more such components for carrying out the appropriate functionalities implemented or supported by server 520. For example, a web server is generally capable of hosting websites containing web pages or particular elements of web pages. More specifically, a web server may host HTML files or other file types, or may dynamically create or constitute files upon a request, and communicate them to clients 530 in response to HTTP or other requests from clients 530. A mail server is generally capable of providing electronic mail services to various clients 530. A database server is generally capable of providing an interface for managing data stored in one or more data stores.

In particular embodiments, one or more data storages 540 may be communicatively linked to one or more servers 520 via one or more links 550. In particular embodiments, data storages 540 may be used to store various types of information. In particular embodiments, the information stored in data storages 540 may be organized according to specific data structures. In particular embodiment, each data storage 540 may be a relational database. Particular embodiments may provide interfaces that enable servers 520 or clients 530 to manage, e.g., retrieve, modify, add, or delete, the information stored in data storage 540.

In particular embodiments, each client 530 may be an electronic device including hardware, software, or embedded logic components or a combination of two or more such components and capable of carrying out the appropriate functions implemented or supported by client 530. For example and without limitation, a client 530 may be a desktop computer system, a notebook computer system, a netbook computer system, a handheld electronic device, or a mobile telephone. This disclosure contemplates any suitable clients 530. A client 530 may enable a network user at client 530 to access network 530. A client 530 may enable its user to communicate with other users at other clients 530.

A client 530 may have a web browser 532, such as MICROSOFT INTERNET EXPLORER, GOOGLE CHROME or MOZILLA FIREFOX, and may have one or more add-ons, plug-ins, or other extensions, such as TOOLBAR or YAHOO TOOLBAR. A user at client 530 may enter a Uniform Resource Locator (URL) or other address directing the web browser 532 to a server 520, and the web browser 532 may generate a Hyper Text Transfer Protocol (HTTP) request and communicate the HTTP request to server 520. Server 520 may accept the HTTP request and communicate to client 530 one or more Hyper Text Markup Language (HTML) files responsive to the HTTP request. Client 530 may render a web page based on the HTML files from server 520 for presentation to the user. This disclosure contemplates any suitable web page files. As an example and not by way of limitation, web pages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a web page encompasses one or more corresponding web page files (which a browser may use to render the web page) and vice versa, where appropriate.

Figure 6:
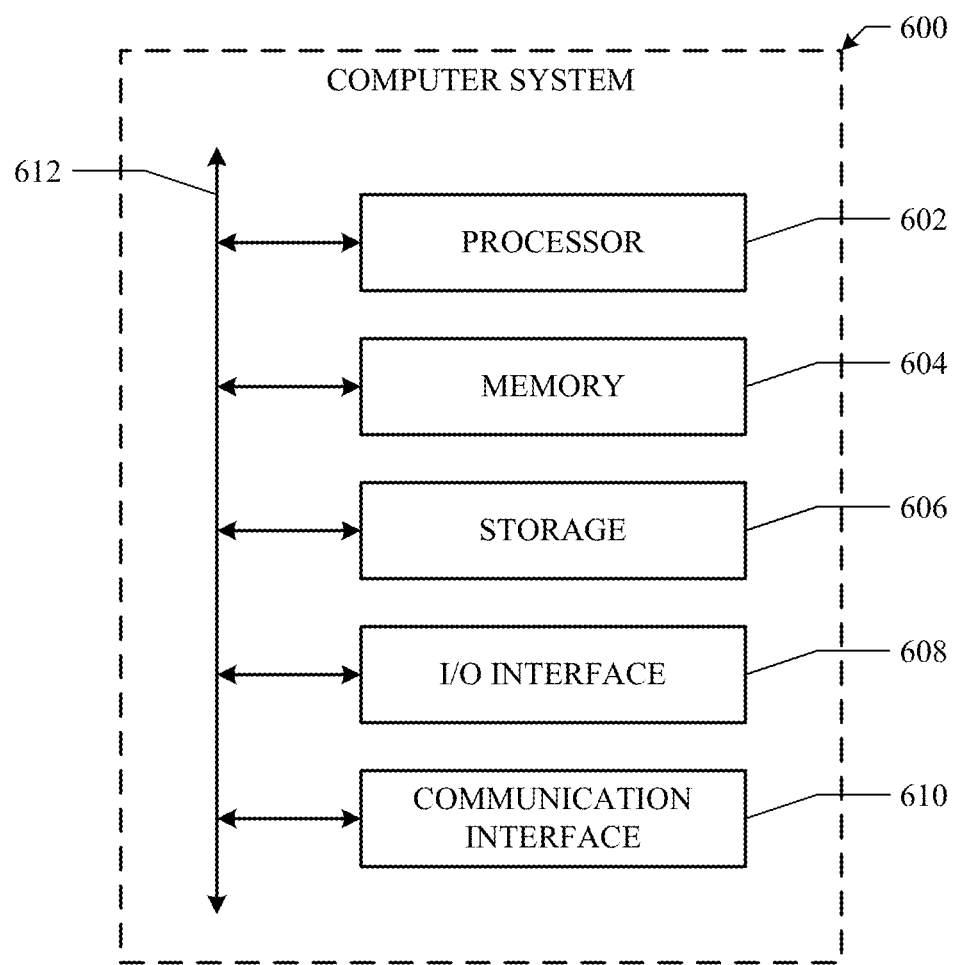
FIG. 6 illustrates an example computer system.

FIG. 6 illustrates an example computer system 600, which may be used with particular embodiments. This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 600 may include one or more computer systems 600; be unitary or distributed; span multiple locations; span multiple machines; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 606, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 606; decode and execute them; and then write one or more results to an internal register, an internal cache, memory 604, or storage 606. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation look-aside buffers (TLBs). Instructions in the instruction caches may be copies of instructions in memory 604 or storage 606, and the instruction caches may speed up retrieval of those instructions by processor 602. Data in the data caches may be copies of data in memory 604 or storage 606 for instructions executing at processor 602 to operate on; the results of previous instructions executed at processor 602 for access by subsequent instructions executing at processor 602 or for writing to memory 604 or storage 606; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 606 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 606 or elsewhere) and operates only on data in one or more internal registers or internal caches or in memory 604 (as opposed to storage 606 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 602, where appropriate. Although this disclosure describes and illustrates particular memory, this disclosure contemplates any suitable memory.

In particular embodiments, storage 606 includes mass storage for data or instructions. As an example and not by way of limitation, storage 606 may include an HDD, a floppy disk drive, flash memory, an optical disc, a magneto-optical disc, magnetic tape, or a Universal Serial Bus (USB) drive or a combination of two or more of these. Storage 606 may include removable or non-removable (or fixed) media, where appropriate. Storage 606 may be internal or external to computer system 600, where appropriate. In particular embodiments, storage 606 is non-volatile, solid-state memory. In particular embodiments, storage 606 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 606 taking any suitable physical form. Storage 606 may include one or more storage control units facilitating communication between processor 602 and storage 606, where appropriate. Where appropriate, storage 606 may include one or more storages 606. Although this disclosure describes and illustrates particular storage, this disclosure contemplates any suitable storage.

In particular embodiments, I/O interface 608 includes hardware, software, or both providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network (such as, for example, a 802.11a/b/g/n WI-FI network, a 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, a Long Term Evolution (LTE) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit (I²C) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, a Advanced Microcontroller Bus Architecture (AMBA) bus, or another suitable bus or a combination of two or more of these. Bus 612 may include one or more buses 612, where appropriate. Although this disclosure describes and illustrates a particular bus, this disclosure contemplates any suitable bus or interconnect.

Figure 7:
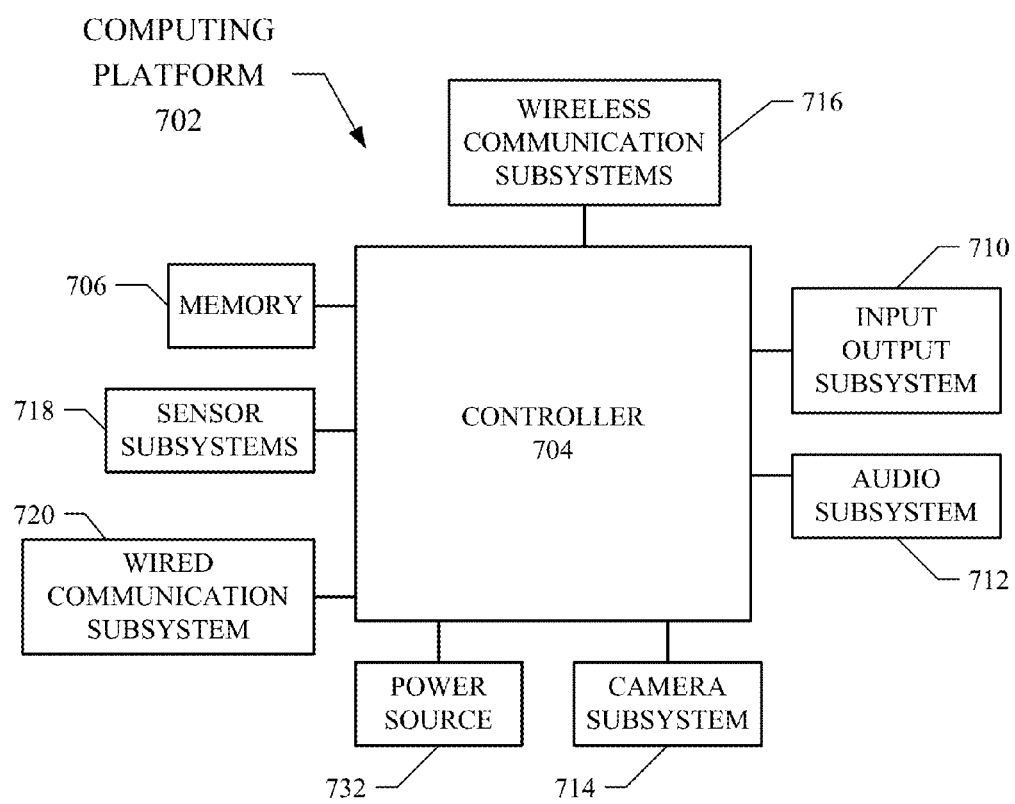
FIG. 7 illustrates an example mobile device platform.

The client-side functionality described above can be implemented as a series of instructions stored on a computer-readable storage medium that, when executed, cause a programmable processor to implement the operations described above. While the client device 122 may be implemented in a variety of different hardware and computing systems, FIG. 7 shows a schematic representation of the main components of an example computing platform of a client or mobile device, according to various particular embodiments. In particular embodiments, computing platform 702 may comprise controller 704, memory 706, and input output subsystem 710. In particular embodiments, controller 704 which may comprise one or more processors and/or one or more microcontrollers configured to execute instructions and to carry out operations associated with a computing platform. In various embodiments, controller 704 may be implemented as a single-chip, multiple chips and/or other electrical components including one or more integrated circuits and printed circuit boards. Controller 704 may optionally contain a cache memory unit for temporary local storage of instructions, data, or computer addresses. By way of example, using instructions retrieved from memory, controller 704 may control the reception and manipulation of input and output data between components of computing platform 702. By way of example, controller 704 may include one or more processors or one or more controllers dedicated for certain processing tasks of computing platform 702, for example, for 2D/3D graphics processing, image processing, or video processing.

Controller 704 together with a suitable operating system may operate to execute instructions in the form of computer code and produce and use data. By way of example and not by way of limitation, the operating system may be Windows-based, Mac-based, or Unix or Linux-based, or Symbian-based, among other suitable operating systems. The operating system, other computer code and/or data may be physically stored within memory 706 that is operatively coupled to controller 704.

Memory 706 may encompass one or more storage media and generally provide a place to store computer code (e.g., software and/or firmware) and data that are used by computing platform 702. By way of example, memory 706 may include various tangible computer-readable storage media including Read-Only Memory (ROM) and/or Random-Access Memory (RAM). As is well known in the art, ROM acts to transfer data and instructions uni-directionally to controller 704, and RAM is used typically to transfer data and instructions in a bi-directional manner. Memory 706 may also include one or more fixed storage devices in the form of, by way of example, hard disk drives (HDDs), solid-state drives (SSDs), flash-memory cards (e.g., Secured Digital or SD cards, embedded MultiMediaCard or eMMD cards), among other suitable forms of memory coupled bi-directionally to controller 704. Information may also reside on one or more removable storage media loaded into or installed in computing platform 702 when needed. By way of example, any of a number of suitable memory cards (e.g., SD cards) may be loaded into computing platform 702 on a temporary or permanent basis.

Input output subsystem 710 may comprise one or more input and output devices operably connected to controller 704. For example, input output subsystem may include keyboard, mouse, one or more buttons, thumb wheel, and/or, display (e.g., liquid crystal display (LCD), light emitting diode (LED), Interferometric modulator display (IMOD), or any other suitable display technology). Generally, input devices are configured to transfer data, commands and responses from the outside world into computing platform 702. The display is generally configured to display a graphical user interface (GUI) that provides an easy to use visual interface between a user of the computing platform 702 and the operating system or application(s) running on the mobile device. Generally, the GUI presents programs, files and operational options with graphical images. During operation, the user may select and activate various graphical images displayed on the display in order to initiate functions and tasks associated therewith. Input output subsystem 710 may also include touch based devices such as touch pad and touch screen. A touchpad is an input device including a surface that detects touch-based inputs of users. Similarly, a touch screen is a display that detects the presence and location of user touch inputs. Input output system 710 may also include dual touch or multi-touch displays or touch pads that can identify the presence, location and movement of more than one touch inputs, such as two or three finger touches.

In particular embodiments, computing platform 702 may additionally comprise audio subsystem 712, camera subsystem 712, wireless communication subsystem 716, sensor subsystems 718, and/or wired communication subsystem 720, operably connected to controller 704 to facilitate various functions of computing platform 702. For example, Audio subsystem 712, including a speaker, a microphone, and a codec module configured to process audio signals, can be utilized to facilitate voice-enabled functions, such as voice recognition, voice replication, digital recording, and telephony functions. For example, camera subsystem 712, including an optical sensor (e.g., a charged coupled device (CCD), or a complementary metal-oxide semiconductor (CMOS) image sensor), can be utilized to facilitate camera functions, such as recording photographs and video clips. For example, wired communication subsystem 720 can include a Universal Serial Bus (USB) port for file transferring, or a Ethernet port for connection to a local area network (LAN). Additionally, computing platform 702 may be powered by power source 732.

Wireless communication subsystem 716 can be designed to operate over one or more wireless networks, for example, a wireless PAN (WPAN) (such as, for example, a BLUETOOTH WPAN, an infrared PAN), a WI-FI network (such as, for example, an 802.11a/b/g/n WI-FI network, an 802.11s mesh network), a WI-MAX network, a cellular telephone network (such as, for example, a Global System for Mobile Communications (GSM) network, an Enhanced Data Rates for GSM Evolution (EDGE) network, a Universal Mobile Telecommunications System (UMTS) network, and/or a Long Term Evolution (LTE) network). Additionally, wireless communication subsystem 716 may include hosting protocols such that computing platform 702 may be configured as a base station for other wireless devices. Other input/output devices may include an accelerometer that can be used to detect the orientation of the device.

Sensor subsystem 718 may include one or more sensor devices to provide additional input and facilitate multiple functionalities of computing platform 702. For example, sensor subsystems 718 may include GPS sensor for location positioning, altimeter for altitude positioning, motion sensor for determining orientation of a mobile device, light sensor for photographing function with camera subsystem 714, temperature sensor for measuring ambient temperature, and/or biometric sensor for security application (e.g., fingerprint reader).

In particular embodiments, various components of computing platform 702 may be operably connected together by one or more buses (including hardware and/or software). As an example and not by way of limitation, the one or more buses may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, a Universal Asynchronous Receiver/Transmitter (UART) interface, a Inter-Integrated Circuit ($I^2C$) bus, a Serial Peripheral Interface (SPI) bus, a Secure Digital (SD) memory interface, a MultiMediaCard (MMC) memory interface, a Memory Stick (MS) memory interface, a Secure Digital Input Output (SDIO) interface, a Multi-channel Buffered Serial Port (McBSP) bus, a Universal Serial Bus (USB) bus, a General Purpose Memory Controller (GPMC) bus, a SDRAM Controller (SDRC) bus, a General Purpose Input/Output (GPIO) bus, a Separate Video (S-Video) bus, a Display Serial Interface (DSI) bus, an Advanced Microcontroller Bus Architecture (AMBA) bus, or another suitable bus or a combination of two or more of these. Additionally, computing platform 702 may be powered by power source 732.

This disclosure contemplates one or more computer-readable storage media implementing any suitable storage. In particular embodiments, a computer-readable storage medium implements one or more portions of processor 602 (such as, for example, one or more internal registers or caches), one or more portions of memory 604, one or more portions of storage 606, or a combination of these, where appropriate. In particular embodiments, a computer-readable storage medium implements RAM or ROM. In particular embodiments, a computer-readable storage medium implements volatile or persistent memory. In particular embodiments, one or more computer-readable storage media embody software. Herein, reference to software may encompass one or more applications, bytecode, one or more computer programs, one or more executables, one or more instructions, logic, machine code, one or more scripts, or source code, and vice versa, where appropriate. In particular embodiments, software includes one or more application programming interfaces (APIs). This disclosure contemplates any suitable software written or otherwise expressed in any suitable programming language or combination of programming languages. In particular embodiments, software is expressed as source code or object code. In particular embodiments, software is expressed in a higher-level programming language, such as, for example, C, Perl, JavaScript, or a suitable extension thereof. In particular embodiments, software is expressed in a lower-level programming language, such as assembly language (or machine code). In particular embodiments, software is expressed in JAVA. In particular embodiments, software is expressed in Hyper Text Markup Language (HTML), Extensible Markup Language (XML), or other suitable markup language.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

This disclosure encompasses all changes, substitutions, variations, alterations, and modifications to the example embodiments herein that a person having ordinary skill in the art would comprehend. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. A method comprising:
   recording a first location of a mobile device;
   determining, by one or more processors of a geographic-positioning component of the mobile device, on a periodic basis, a current location of the mobile device;
   detecting, by the processors of the geographic-positioning component, a current status of the mobile device, the current status comprising:
   a detected velocity of the mobile device;
   time of day information;
   a battery level of the mobile device; and
   an error of the determined location measurement;
   calculating, by the processors of the geographic-positioning component, a radius defining a geographic region around the first location, wherein the size of the radius is adjusted from a pre-determined value based on one or more components of the current status;
   determining, by the processors of the geographic-positioning component, whether the current location is outside the geographic region; and
   if the current location is outside the geographic region, then sending, by the processors of the geographic-positioning component, a message to one or more other processors of the mobile device, the message causing one or more of the other processors to transition from a sleep state to an active state.

2. The method of claim 1, wherein the message identifies the current location.

3. The method of claim 1, wherein the first or current location is based at least in part on:
   a global positioning system (GPS) signal;
   a Wi-Fi signal; or
   a cellular radio signal.

4. One or more computer-readable non-transitory storage media within a mobile device, the media embodying logic that is operable when executed to:
- record a first location of a mobile device;
- determine on a periodic basis a current location of the mobile device;
- detect, by the processors of the geographic-positioning component, a current status of the mobile device, the current status comprising:
- a detected velocity of the mobile device;
- time of day information;
- a battery level of the mobile device; and
- an error of the determined location measurement;
- calculate a radius defining a geographic region around the first location, wherein the size of the radius is adjusted from a pre-determined value based on one or more components of the current status;
- determine, by the processors of the geographic-positioning component, whether the current location is outside the geographic region; and
- if the current location is outside the geographic region, then send a message to one or more processors of the mobile device, the message causing one or more of the processors to transition from a sleep state to an active state.

5. The method of claim 4, wherein the message identifies the current location.

6. The media of claim 4, wherein the first or current location is based at least in part on:
- a global positioning system (GPS) signal;
- a Wi-Fi signal; or
- a cellular radio signal.

7. A system comprising:
- one or more processors; and
- a memory coupled to the processors comprising instructions executable by the processors, the processors being operable when executing the instructions to:
- record a first location of a mobile device;
- determine on a periodic basis a current location of the mobile device;
- detect, by the processors of the geographic-positioning component, a current status of the mobile device, the current status comprising:
- a detected velocity of the mobile device;
- time of day information;
- a battery level of the mobile device; and
- an error of the determined location measurement;
- calculate a radius defining a geographic region around the first location, wherein the size of the radius is adjusted from a pre-determined value based on one or more components of the current status;
- determine, by the processors of the geographic-positioning component, whether the current location is outside the geographic region; and
- if the current location is outside the geographic region, then send a message to one or more processors of the mobile device, the message causing one or more of the processors to transition from a sleep state to an active state.

8. The system of claim 7, wherein the message identifies the current location.

9. The system of claim 7, wherein the first or current location is based at least in part on:
- a global positioning system (GPS) signal;
- a Wi-Fi signal; or
- a cellular radio signal.

* * * * *